May 12, 1925.

H. J. OVERAASEN 1,537,784

TILTING MECHANISM FOR MOTOR TRUCKS

Filed Nov. 5, 1923

Inventor
H. J. Överaasen
by Langner, Parry, Card & Langner
Att'ys.

Patented May 12, 1925.

1,537,784

UNITED STATES PATENT OFFICE.

HANS JOHANESEN ÖVERAASEN, OF GJOVIK, NORWAY.

TILTING MECHANISM FOR MOTOR TRUCKS.

Application filed November 5, 1923. Serial No. 673,010.

*To all whom it may concern:*

Be it known that I, HANS JOHANESEN ÖVERAASEN, a subject of the King of Norway, of Gjovik, Norway, have invented certain new and useful Improvements in Tilting Mechanism for Motor Trucks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a tilting mechanism for motor trucks, and has for its object to provide an improved, simple and effective mechanism of this kind.

Figure 1:
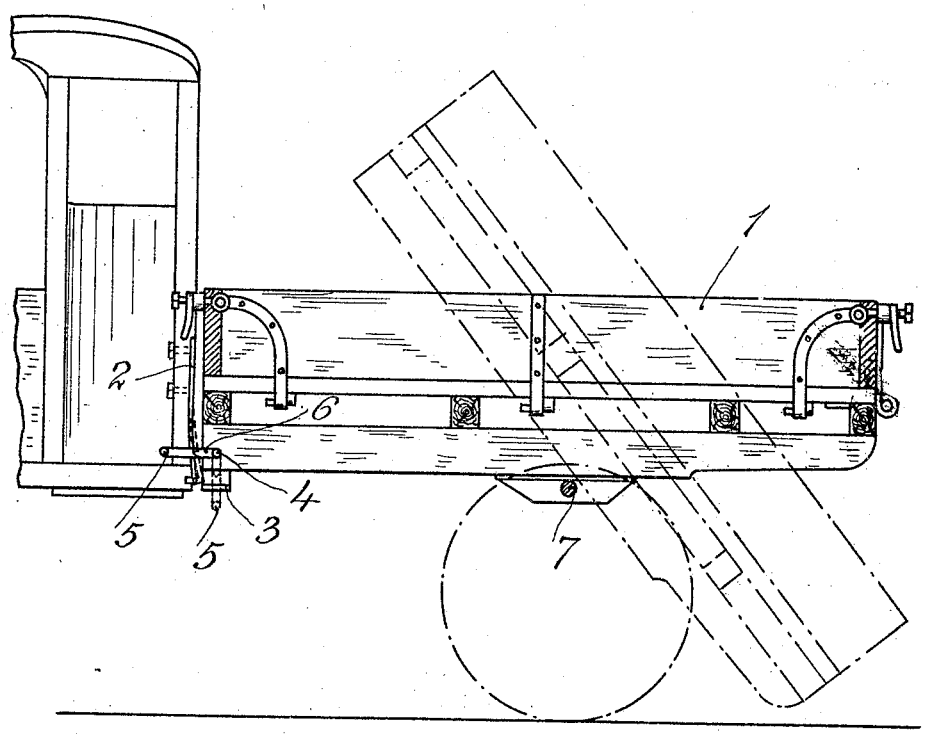
Figure 2:
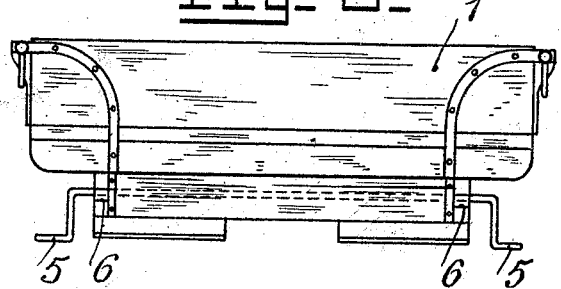

An executional form of the invention is illustrated in the accompanying drawing, Fig. 1 being a side view of a truck and Fig. 2 an end view of the tilting box.

The tilting box or casing 1 of the motor truck with its front end is locked to the frame of the car by aid of lock springs 2, fastened to an upright part of the frame or the housing of the car, said springs engaging with their lower free ends iron detents 3, fastened to the underside of the tilting box. The locking position of the said springs is indicated in dotted lines on Fig. 1.

In the lower part of the tilting box, near its front wall, is turnably mounted a releasing bar 4, serving for unlocking the tilting box, said bar being preferably provided with one handle 5 on each side of the box. These handles 5 are preferably crankshaped and are normally hanging down as shown in dotted lines in Fig. 1 and in full lines in Fig. 2.

When the box 1 is to be tilted the bar 4 is by aid of one of the handles 5 turned into the position shown in full lines in Fig. 1, cams 6 on said bar being in this position pressed against the respective springs 2 so as to press them out of engagement with the detents 3 of the tilting box, leaving the latter free to be tilted about the tilting shaft 7 as indicated in broken lines in Fig. 1.

Instead of two locking springs I may also use a larger number, or only one, providing always a corresponding number of cams on the releasing bar.

Claims:

1. In tilting mechanism for motor trucks the combination with a truck body, a tilting box turnably connected with said truck body, detents fastened to said tilting box, locking springs fastened to the upright part of said truck body and engaging said detents, of a releasing bar transversely disposed and rotatably mounted on the tilting box and having crank shaped turning handles on each end one on each side of the said box for releasing the locking springs from engagement with the detents on the tilting box.

2. In tilting mechanism for motor trucks the combination with a truck body, a tilting box turnably connected with said truck body, a detent fastened to said tilting box, a locking spring fastened to an upright part of said truck body and engaging said detent, of a releasing bar transversely disposed and rotatably mounted on the tilting box, crank shaped handles one on each end of the bar at the sides of the tilting box, and a cam on said bar to engage the spring on rotation of the bar for releasing said locking spring from its engagement with the said detent on the tilting box.

In testimony that I claim the foregoing as my invention, I have signed my name in presence of two subscribing witnesses.

HANS JOHANESEN ÖVERAASEN.

Witnesses:
AUGUST BUGGE,
OLGA MÜLLER.